US007226069B2

(12) United States Patent
Ueda et al.

(10) Patent No.: US 7,226,069 B2
(45) Date of Patent: Jun. 5, 2007

(54) POWER-ASSISTED STEERING SYSTEM AND DIFFERENCE COMPENSATING METHOD FOR CURRENT DETECTOR

(75) Inventors: Takeshi Ueda, Nara (JP); Masahiko Sakamaki, Aichi (JP); Shigeki Nagase, Mie (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 10/968,948

(22) Filed: Oct. 21, 2004

(65) Prior Publication Data

US 2005/0087387 A1    Apr. 28, 2005

(30) Foreign Application Priority Data

Oct. 22, 2003    (JP)    ............................ P.2003-361770

(51) Int. Cl.
*B62D 5/04*    (2006.01)
(52) U.S. Cl. ...................... 280/446; 180/402; 180/444; 318/430; 318/432; 318/434; 701/41; 701/42; 701/43; 701/84; 701/87
(58) Field of Classification Search ................ 180/444, 180/446; 318/430, 432, 434; 701/41, 84, 701/87, 43
See application file for complete search history.

(56) References Cited

U.S. PATENT DOCUMENTS 4,809,173 A * 2/1989 Fukami et al. ................ 701/43
5,787,376 A * 7/1998 Nishino et al. ............... 701/41
6,810,986 B2 * 11/2004 Takagi ........................ 180/446
6,812,660 B2 * 11/2004 Takahashi et al. .......... 318/254
6,837,331 B2 * 1/2005 Kawada et al. ............. 180/446
2002/0109474 A1 * 8/2002 Kifuku et al. .............. 318/434
2003/0030406 A1 * 2/2003 Takahashi et al. .......... 318/714
2003/0106738 A1 * 6/2003 Yoneda et al. .............. 180/446

FOREIGN PATENT DOCUMENTS

JP    10-75598    3/1998

* cited by examiner

*Primary Examiner*—Lesley D. Morris
*Assistant Examiner*—Marlon Arce-Dlaz
(74) *Attorney, Agent, or Firm*—McGinn IP Law Group, PLLC (57) ABSTRACT

A power-assisted steering system includes: two or more current detectors that detects current flowing to two or more phases of a motor and outputs detected current values; a correcting unit that corrects the detected current values output from the current detectors to compensate a difference in gain between the current detectors; and a motor driving driver that drives the motor based on a deviation between the target current value and corrected detected current values. When the same current flows to the phase in which the current flowing thereto is detected by the reference current detectors and the phase in which the current flowing is detected by the other current detector, the correcting unit calculates a gain correcting coefficient based on a detected current value of the reference current detector and a detected current value of the other current detector and corrects the detected current value of the other current detector.

6 Claims, 5 Drawing Sheets

POWER-ASSISTED STEERING SYSTEM AND DIFFERENCE COMPENSATING METHOD FOR CURRENT DETECTOR

BACKGROUND OF THE INVENTION

The present invention relates to a power-assisted steering system in which a steering mechanism of a vehicle is provided with an auxiliary steering force by driving an electric motor.

Conventionally, an electric power-assisted steering system has been in use in which a steering mechanism is provided with an auxiliary steering force by driving an electric motor in accordance with a steering torque exerted on a steering wheel by a driver of the vehicle. A torque sensor is provided in the electric power-assisted steering system for detecting a steering torque exerted on the steering wheel, which is a manipulating device for steering the vehicle, and a target value for a current (hereinafter, referred to as a "target current value") that is to be supplied to the electric motor is set based on the steering torque detected by the torque sensor. Then, a command value that is to be provided to a driving device for the electric motor is generated through a proportional integration operation based on the steering torque detected by the torque sensor. The electric motor driving device includes a PWM signal generating circuit for generating a pulse width modulation signal (hereinafter, referred to as a "PWM signal") having a duty ratio which corresponds to the command value and a motor driving circuit which is configured by utilizing a power transistor which is on and off in accordance with the duty ratio of the PWM signal and applies to the electric motor a voltage which corresponds to the duty ratio. A current caused to flow to the electric motor by the application of the voltage is detected by a current detector, and a difference between the target current value and the detected current value so detected is used as a deviation for generating the command value.

In recent years, there have been cases where a brushless motor is used in an electric power-assisted steering system like one described above. It is a general practice with the electric power-assisted steering system in which a brushless motor having three phases is used that there are provided current detectors for detecting current flowing to any two of the three phases of the brushless motor, for example, current flowing to, for example, the U-phase and V-phase thereof. Note that current then flowing to the W-phase can be obtained through a calculation.

In a configuration like one described above, there exists an intrinsic error resulting from a difference caused intrinsically between the individual current detectors in a gain which is a ratio of an output value of the current detector to a measured current value (an input value) thereof. Note that this gain corresponds to the inclination of a straight line indicating a corresponding relationship between the measured value and the output value. In case a motor control is implemented without considering the influence of the gain difference of the current detector, there is caused a torque ripple, and the driver feels a feeling of physical disorder when manipulating the steering wheel.

With a view to eliminating the influence from the gain difference of the current detector that has been described above, there exists a conventional electric power-assisted steering system in which an output value of a current detector is regulated by means of a hardware (refer to, for example, a patent literature No. 1). In addition, there exists an electric power-assisted steering system in which a reference current detector which is accurately regulated at the time of production is provided outside the electric power-assisted steering system, whereby an output value of the current detector incorporated within the system is corrected or regulated by means of a predetermined software by comparing an output value of the reference current detector with the output value of the current detector so incorporated.

Patent Literature No. 1: JP-A-10-75598

With the conventional configuration in which the output value of the current detector is regulated by the hardware, however, the production costs are increased due to the additional part, and in the event that a regulating process of the hardware has to be added, man-hours also have to be increased.

In addition, in the event that the output value of the incorporated current detector is corrected or regulated by means of the software based on the reference current detector provided outside the system, the reference current detector which is accurately regulated has to be prepared. Furthermore, since it cannot be avoided that a predetermined error is generated when regulating the output value of the current detector, it is normal that the output value of the reference current detector does not coincide with the corrected or regulated output value of each current detector completely. Here, even with a deviation between the output value of the reference current detector and the output value of each current detector being relatively small, when output values of a plurality of current detectors are compared with each other, there may be a case where the (relative) deviation becomes relatively large. As this occurs, the aforesaid torque ripple may take place, causing thereby the driver to feel a feeling of physical disorder when turning the steering wheel.

SUMMARY OF THE INVENTION

Then, an object of the invention is to provide a power-assisted steering system which can provide a steering feel which is free from a feeling of physical disorder by suppressing a torque ripple which occurs as the effect of a gain difference between respective current detectors.

In order to solve the aforesaid object, the invention is characterized by having the following arrangement.

1. A power-assisted steering system in which a steering mechanism of a vehicle is provided with an auxiliary steering force by driving a brushless motor having three or more phases and terminals based on a target current value determined in accordance with an operation for steering the vehicle, the power-assisted steering system comprising:

two or more current detectors that detects current flowing to two or more of the phases of the brushless motor, respectively, and outputs detected current values, the current detectors respectively including inherent gain values;

a correcting unit that corrects the detected current values output from the two or more current detectors so as to compensate a difference in gain between the current detectors; and a motor driving driver that drives the brushless motor based on a deviation between the target current value and detected current values which are corrected by the correcting unit; wherein when the same current flows to the phase in which the current flowing thereto is detected by one of the two or more current detectors which constitutes a reference and the phase in which the current flowing thereto is detected by the other current detector of the two or more current detectors, the correcting unit calculates a gain correcting coefficient for compensating for a gain difference of the other current detector relative to the current detector which constitutes the reference based on a detected current value of the current detector which constitutes the reference and a detected current value of the other current detector and corrects the detected current value of the other current detector based on the calculated gain correcting coefficient.

(2) The power-assisted steering system according to (1), wherein the correcting unit can make the same current flow to the respective phases in which the current flowing thereto is detected by the current detector which constitutes the reference and the other current detector, respectively, by opening one or more of the terminals and calculates the gain correcting coefficient based on detected current values of the same current.

(3) A method for compensating for a gain difference between two or more current detector which are provided on a power-assisted steering system in which a steering mechanism of a vehicle is provided with an auxiliary steering force by driving a brushless motor having three or more phases and terminals based on a target current value determined in accordance with an operation for steering the vehicle and which is adapted to detect current flowing to predetermined phases possessed by the brushless motor and to output the detected current values, the compensating method comprising:

an opening step of opening one or more of the terminals so that the same current is made to flow to phases of the three or more phases in which current flowing thereto is detected by two of the two or more current detectors which include a current detector which constitutes a reference, respectively;

a voltage applying step of making the same current to flow to the two current detectors by applying a predetermined voltage between the terminals which are not opened in the opening step; and a correcting step of compensating for a gain difference of the other current detector relative to the current detector which constitutes a reference based on detected current values which are obtained by detecting the same current which is made to flow in the voltage applying step by the two current detectors.

According to the first aspect of the invention, the gain correcting coefficient for compensating for the gain difference of the other current detector relative to the current detector which constitutes a reference based on the detected current values of the current detector which constitutes a reference and the other current detector, and the detected current value output from the other current detector is corrected based on the gain correcting coefficient so calculated, whereby since the generation of a torque ripple due to the gain difference between the respective current detector can be suppressed, thereby making it possible to provide the driver with a steering feel which is free from a feeling of physical disorder.

According to the second aspect of the invention, the gain correcting coefficient is calculated based on the detected current values of the current which flows only to the current detector for the phase constituting a reference (for example, a U-phase) and the current detector for the other phase (for example, a V-phase) by opening the one or more motor terminals (for example, one of a W-phase), whereby since the gain correcting coefficient can be calculated in a simple method, the generation of a torque ripple due to the gain difference between the respective current detector can be suppressed simply, thereby making it possible to providing the driver with a steering feel which is free from a feeling of physical disorder.

According to the third aspect of the invention, the gain difference of the other current detector relative to the current detector which constitutes a reference is compensated for based the detected current values which are detected by opening the one or more motor terminals (for example, the one end of the W-phase) and making the same current to flow to the two current detector by applying the predetermined voltage between the terminals which are not opened (for example, between the U-phase and V-phase), whereby the generation of the torque ripple due to the gain difference between the respective current detector can be suppressed simply, thereby making it possible to provide the driver with a steering feel which is free from a feeling of physical disorder.

DETAILED DESCRIPTION OF PREFERRED EMBODIMENTS

Hereinafter, an embodiment of the invention will be described by reference to the accompanying drawings.

<1. Overall Configuration>

Figure 1:
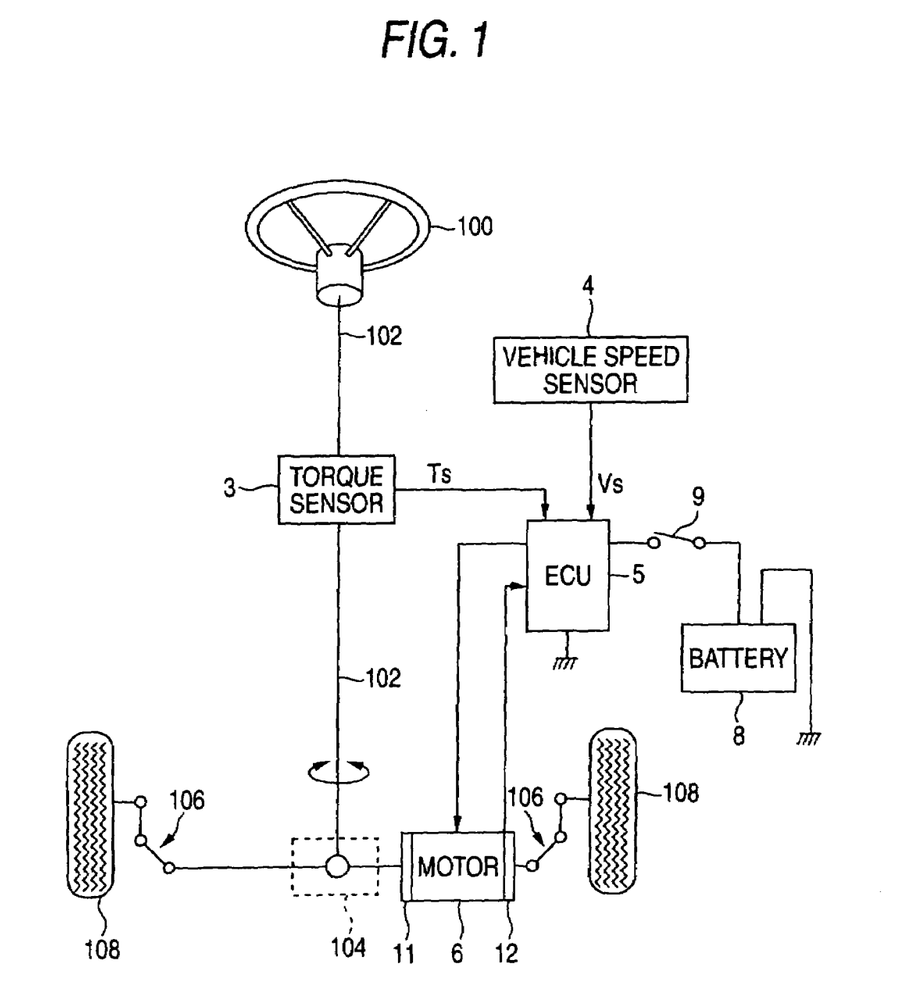
FIG. 1 is a schematic diagram showing the configuration of an electric power-assisted steering system according to an embodiment of the invention, together with the configuration of a vehicle which is associated with the steering system.

FIG. 1 is a schematic diagram showing the configuration of an electric power-assisted steering system according to an embodiment of the invention, together with the configuration of a vehicle which is associated with the electric power-assisted steering system. This electric power-assisted steering system includes a steering shaft 102 which is connected at one end thereof to a steering wheel 100 as a manipulating device for steering, a rack and pinion mechanism 104 coupled to the other end of the steering shaft 102, a torque sensor 3 for detecting a steering torque Ts exerted on the steering shaft 102 through the manipulation of the steering wheel 100, a vehicle speed sensor 4 for detecting a running speed Vs of the vehicle, a brushless motor 6 for generating an auxiliary steering force to reduce a load borne by the driver when manipulating the steering wheel 100, a ball screw driving portion 11 for transmitting the auxiliary steering force to a rack shaft, a position detecting sensor 12 for detecting the rotational position of a rotor of the brushless motor 6 and an electronic control unit (ECU) 5 which receives a power supply from an on-board battery 8 for controlling the driving of the motor 6 based on sensor signals from the torque sensor 3 and the vehicle speed sensor 4.

When the driver manipulates the steering wheel 100, the motor 6 is driven by the ECU 5 based on a steering torque Ts detected by the torque sensor 3, a vehicle speed Vs detected by the vehicle speed sensor 4 and the rotational position of the rotor detected by the position detecting sensor 12, whereby the motor 6 generates an auxiliary steering force, and the auxiliary steering force so generated is transmitted to the rack shaft via the ball screw driving portion 11 so as to the load borne by the driver is reduced. Namely, the rack shaft performs reciprocating motions by the steering torque Ts exerted through the manipulation of the steering wheel and the auxiliary steering force generated by the motor 6. Both ends of the rack shaft are connected to wheels 8, respectively, via coupling members each made up of a tie rod and a knuckle arm, whereby the direction of the wheels 108 varies according to the reciprocating motions of the rack shaft.

<2. Configuration of Control System>

Figure 2:
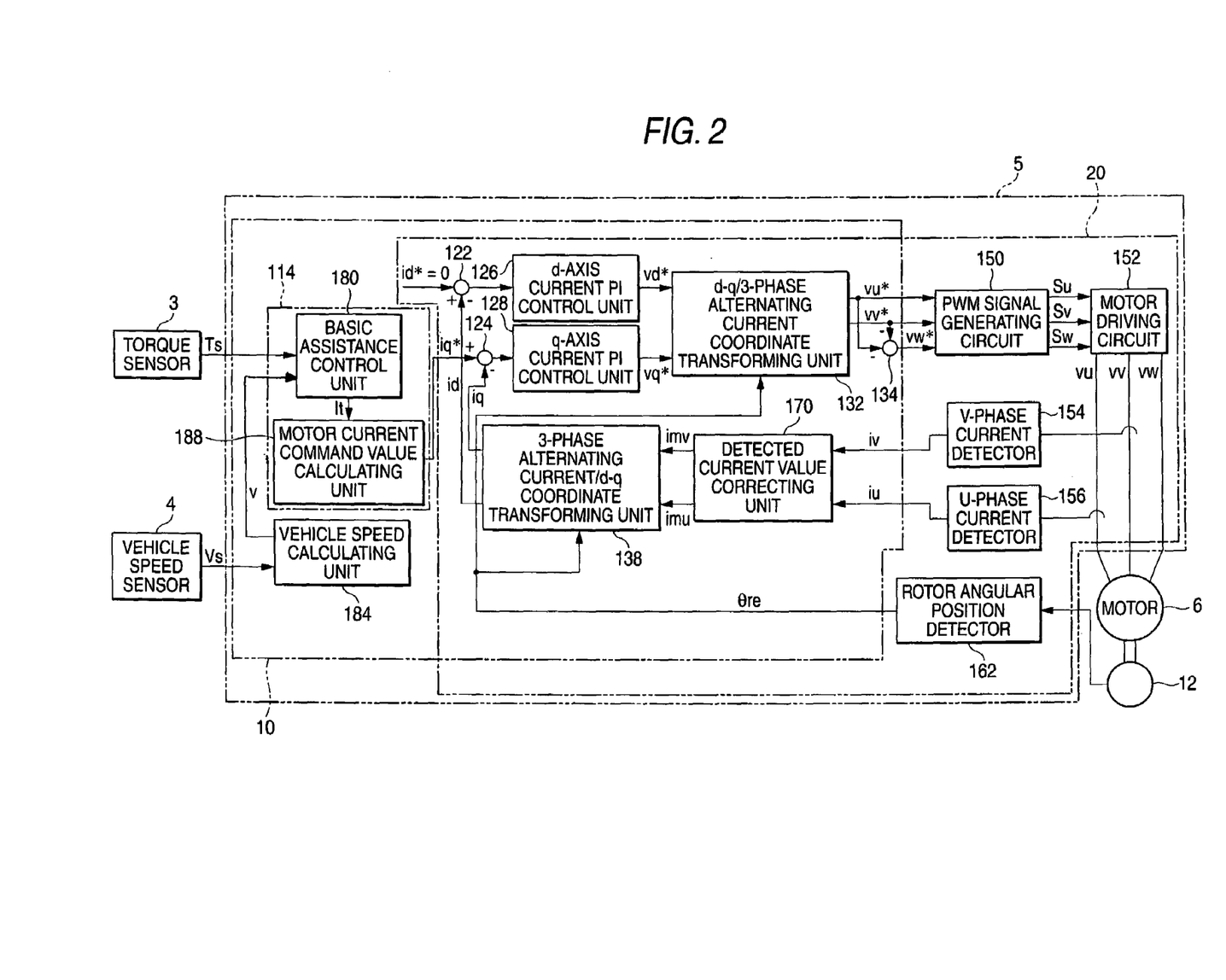
FIG. 2 is a block diagram showing the configuration of the electric power-assisted steering system according to the from the controlling point of view.

FIG. 2 is a block diagram showing the configuration of the ECU 5, which is a control system in the electric power-assisted steering system. The ECU 5 is constituted by a microcomputer 10 and a motor driving unit. By executing a predetermined program stored in a memory installed in the interior thereof, the microcomputer 10 functions a motor control unit which includes a vehicle speed calculating unit 184, a target current calculating unit 114, subtracters 122, 124, a d-axis current PI control unit 126, a q-axis current PI control unit 128, a d-q/3-phase alternating current coordinate transforming unit 132, a sign reversal adder 134, a 3-phase/d-q coordinate transforming unit 138 and a detected current value correcting unit 170. The target current calculating unit 114 includes a basic assistance control unit 180 and a motor current command value calculating unit 188. The motor driving unit is a hardware (circuit) for driving the 3-phase brushless motor 6 based on a voltage command value output from the microcomputer 10 and includes a PWM signal generating circuit 150, a motor driving circuit 152, a U-phase current detector 156, a V-phase current detector 154 and a rotor angular position detector 162. In addition, a relay (not shown) is provided in the ECU 5, and the power supply is supplied to the motor driving unit and the brushless motor 6 while the relay is closed.

When the steering wheel 100 is manipulated, a steering torque Ts detected by the torque sensor 3 is input into the ECU 5, and a vehicle speed signal Vs detected by the vehicle speed sensor 4 is also input into the ECU 5. A vehicle speed V is calculated based on the vehicle speed signal Vs so detected in the vehicle speed calculating unit 184. In addition, the rotor angular position detector 162 outputs a signal indicating the rotational position or an electric angle ere of a revolving field (a permanent magnet) which is a rotor of the motor 6 based on a sensor signal output from the position detecting sensor 12 mounted on the motor.

The basic assistance control unit 180 determines a target current value. It which should be made to flow to the motor 6 based on the steering torque Ts and the vehicle speed V while referring to a table called an assistance map which establishes a correspondence between the steering torque and the target current value. The motor current command value calculating unit 188 outputs a q-axis current command value iq* based on the target current value It. This q-axis current command value iq* is a current value which corresponds to a torque that is to be generated by the motor 6 and is input into the subtracter 124. On the other hand, since a d-axis current command value id* is not associated with torque, the d-axis current value id* is input into the subtracter 122 as id*=0.

The U-phase current detector 156 and the V-phase current detector 154 detect current flowing to a U-phase winding and a V-phase winding (in this specification, referred to simply as "U-phase, V-phase", respectively) of the motor, respectively, and output a U-phase detected current value iu and a V-phase detected current value iv in the form of a voltage signal. While these U-phase current detector 156 and the V-phase current detector 154 are disposed relative to lines connecting from the motor driving circuit 152 to the motor 6, the respective detectors may be disposed between respective driving devices within the motor driving circuit 152 and a grounded point. Note that as has been described before, the intrinsic gain difference are included in the U-phase detected current value iu and the V-phase detected current value iv.

The detected current value correcting unit 170 sets a corresponding offset correction value based on a U-phase detected current value iu and a V-phase detected current value iv which result when the ignition is switched on. Here, the offset correction value means a correction value for eliminating the effect of an offset current detected by the current detectors irrespective of the fact that current that is made to flow to the motor is nil.

The detected current value correcting unit 170 corrects the U-phase detected current value iu by subtracting the corresponding offset correction value from the U-phase detected current value iu and outputs a U-phase motor current value imu based on a detected current value so corrected.

In addition, the detected current value correcting unit 170 corrects the V-phase detected current value iv by subtracting a corresponding offset correction value from the V-phase detected current value iv and multiplying a value obtained through the subtraction by a V-phase gain correcting coefficient, which will be described later on, in such a manner that a gain value of the V-phase current detector 154 becomes equivalent to the gain value of the U-phase current detector 156 as a result (nominally) and outputs a V-phase detected current value iv based on the corrected current value. Thus, the gain difference of the V-phase current detector 154 relative to the U-phase current detector 156 is eliminated as a result of the multiplication by the gain correcting coefficient. Namely, since a relative detection error caused by the gain difference between the current detectors is eliminated, a torque ripple generated based on the gain difference of each current detector is reduced.

Here, since the detected current value of the V-phase current detector 154 relative to the gain of the U-phase current detector 156 is corrected using the gain as the reference, in case there exists a deviation between a true current value which flows to the U-phase and the detected current value by the U-phase current detector 156, the detected current value of the V-phase current detector also generates the same deviation. Thus, it is considered that the torque of the motor 6 which is actually obtained deviates from the ideal value by the deviation generated between the actual gain of each current detector and the (designed) ideal gain. However, since the deviation so caused between the detected current value of the U-phase current detector 156 and the true current value is a slight deviation based on the production tolerance and the effect of the deviation is eliminated almost completely by the feedback control of the motor control unit and motor driving unit based on the steering torque Ts detected by the torque sensor 3 (within a torque feedback loop), there is no case where the driver feels a feeling of physical disorder when manipulating the steering wheel.

Note that the details of the correction process operation at the detected current value correcting unit 170 and a method for calculating a V-phase gain correcting coefficient will be described later on.

The 3-phase alternating current/d-q coordinate transforming unit 138 transforms the U-phase motor current value imu and the V-phase motor current value imv into a d-axis motor current value id and a q-axis motor current value iq which are values on a d-q coordinate based on the electric angle θre of the rotor. The d-axis motor current value id and the q-axis motor current value iq are input into the subtracter 122 and the subtracter 124, respectively.

A deviation id*-id between the d-axis current command value id* and the d-axis motor current value id is output from the subtracter 122. Then, a d-axis voltage command value vd* is output from the d-axis current PI control unit 126 through a proportional integration operation based on the deviation id*-id so output. On the other hand, a deviation iq*-iq between the q-axis current command value iq* and the q-axis motor current value iq is output from the subtracter 124. Then, a q-axis voltage command value vq* is output from the q-axis current PI control unit 128 through a proportional integration operation based on the deviation iq*-iq so output.

The d-q/3-phase alternating current coordinate transforming unit 132 transforms the d-axis voltage command value vd* and the q-axis voltage command value vq* into a U-phase voltage command value v* and a V-phase voltage command value vv* which are values on a 3-phase alternating current coordinate based on the electric angle θre of the rotor. Then, the sign reversal adder 134 calculates a W-phase voltage command value vw* from the U-phase voltage command value vu* and the V-phase voltage command value vv*.

The PWM signal generating circuit 150 receives the U-phase voltage command value vu*, the V-phase voltage command value vv* and the W-phase voltage command value vw* and generates PWM signals Su, Sv, Sw whose duty ratios vary in accordance with the command values so received. In the motor driving circuit 152, switching devices are switched on and off by the PWM signals Su, Sv, Sw so generated, whereby voltages vu, vv, vw which correspond to the duty ratios are applied to the U-phase, V-phase and W-phase of the motor 6, respectively.

<3. Operation of Detected Current Value Correcting Unit>

Figure 3:
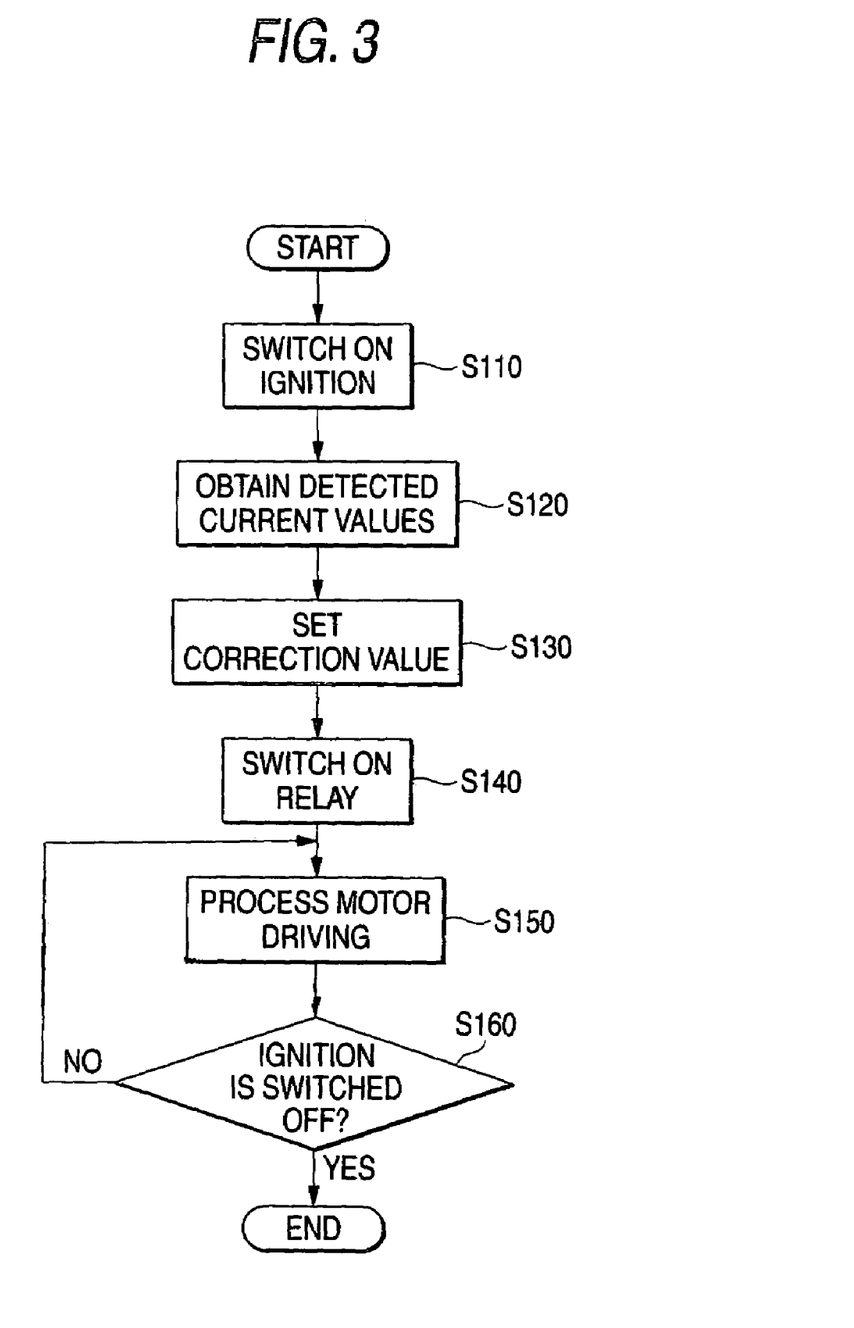
FIG. 3 is a flowchart illustrating a correcting procedure of detected current values according to the embodiment of the invention.

Next, the correcting process by the detected current value correcting unit 170 according to the embodiment of the invention will be described below. FIG. 3 is a flowchart illustrating a correcting procedure of detected current values. Note that the function of the detected current value correcting unit 170 shown in FIG. 2 is realized in processing steps shown as step S130 and S150 in the flowchart.

In the electric power-assisted steering system, when an ignition switch 9 is switched on (step S110), the microcomputer 10 sets a value set in advance at the time of production to a V-phase gain correcting coefficient gv, which is a parameter. A method for determining a value which is set to the V-phase gain correcting coefficient gv at the time of production will be described later on. When these values are set, proceed to a process in step S140.

In step S140, the relay is closed (put in an ON state), and in step S150, the detected current value correcting unit 170 corrects the U-phase detected current value iu by subtracting the U-phase offset correction value iou from the U-phase detected current value iu and outputs the U-phase motor current value imu. In addition, the detected current value correcting unit 170 corrects the V-phase detected current value iv by subtracting the V-phase offset correction value iov from the V-phase detected current value iv and multiplying the value obtained through the subtraction by the reciprocal number of the predetermined reference gain value and outputs the V-phase motor current value imv. Then, the conventional motor driving process is performed based on these output current values.

In step S160, it is determined whether or not the ignition switch 9 has been switched off. If the ignition switch 9 is determined to have been switched off, the aforesaid processes are completed and the operation of the electric power-assisted steering system is stopped. If the switch is determined not to have been switched off yet, return to the process in step S150, so that the processes in steps S150 and S160 are repeated while the electric power-assisted steering system is in operation.

<4. Method for Calculating V-phase Gain Correcting Coefficient>

Figure 4:
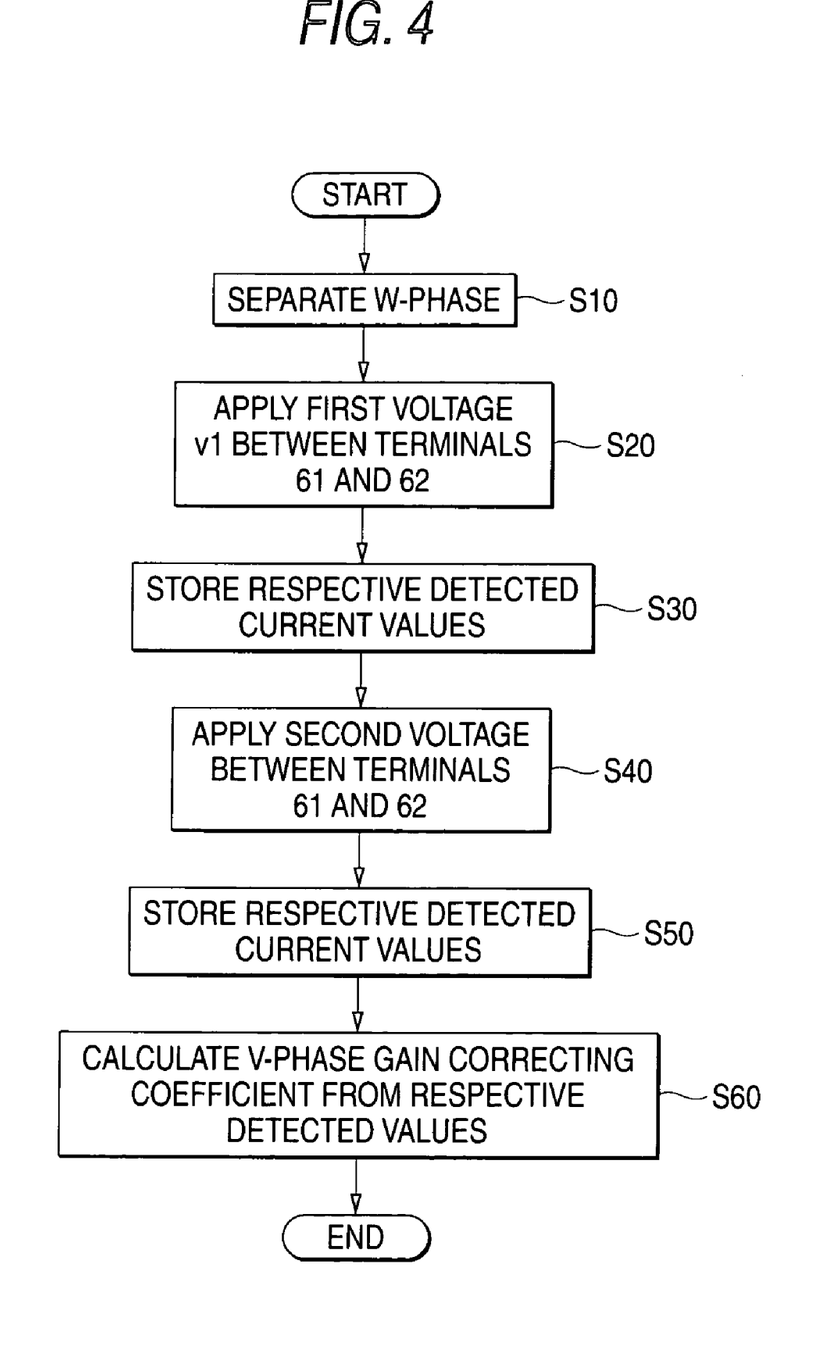
FIG. 4 is a flowchart illustrating a calculating procedure of a V-phase gain correcting coefficient according to the embodiment.

Next, a method for calculating a V-phase gain correcting coefficient according to the embodiment of the invention will be described by reference to FIGS. 4 and 5. FIG. 4 is a flowchart illustrating a calculation procedure of a V-phase gain correcting coefficient. Note that here, it is understood that a V-phase gain correcting coefficient is calculated at the time of producing (regulating) the electric power-assisted steering system of the invention. In addition, while the following calculating procedure is executed by a predetermined software stored in the microcomputer 10, the calculating procedure may be executed by a predetermined regulating system (or an inspection system), which is such as other than the electric power-assisted steering system of the invention, for calculating a V-phase gain correcting coefficient.

Figure 5:
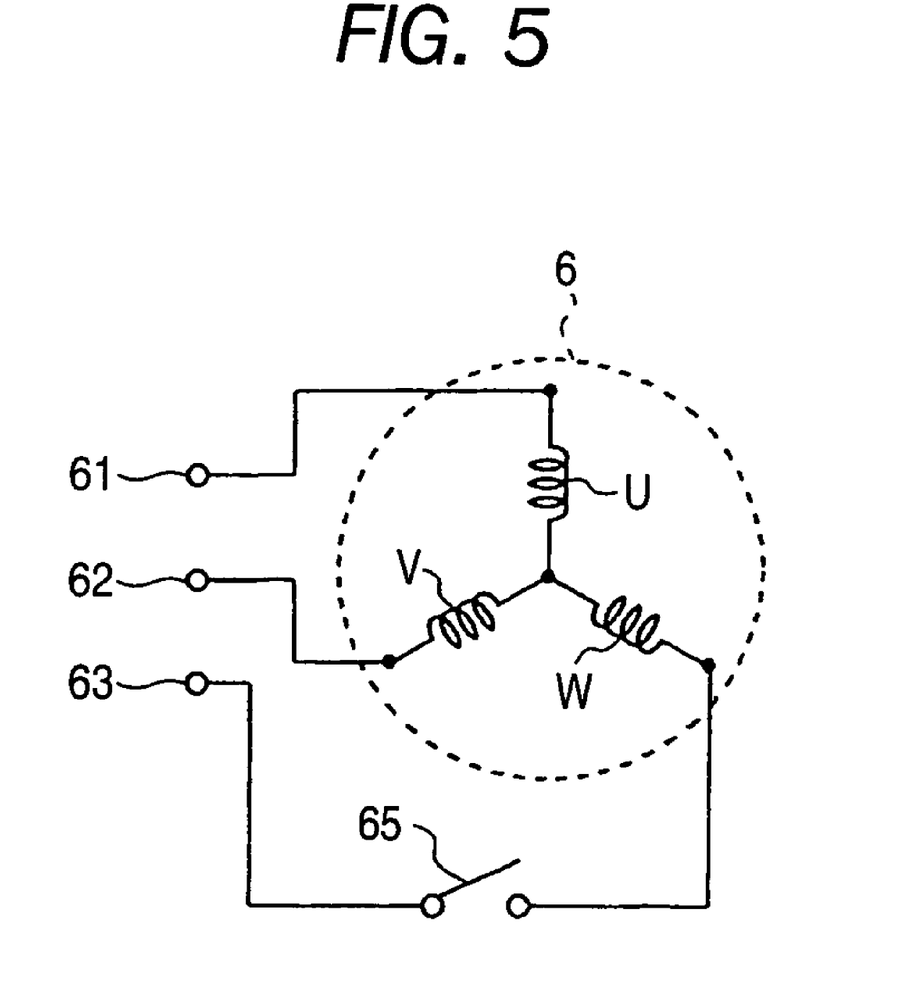
FIG. 5 is a diagram illustrating the connection of a motor according to the embodiment of the invention.

In addition, FIG. 5 is a diagram illustrating the connection to the motor 6. As shown in FIG. 5, the motor 6 is connected in a Y-connection, in which a terminal 61 is connected to one end of a U-phase wiring, a terminal 62 is connected to one end of a V-phase wiring, and a terminal 63 is connected to one end of a W-phase wiring. A switch 65 passes or cuts off (on or off) current to the W-phase wiring. This switch 65 is, for example, a relay that is controlled by the microcomputer 10.

In step S10 shown in FIG. 4, the switch 65 is switched off in order to electrically separate from the other phases, whereby the terminal 63 is released and the W-phase is put in a state where no current passes therethrough.

Next, in step S20, a first voltage v1 is applied between the terminal 61 and the terminal 62, whereby the first current v1 is allowed to flow to the U-phase and V-phase, respectively. Note that while the value of this first current can be obtained by accurately measuring the current with, for example, a current detector which is prepared in advance outside the system so as to constitute a reference, or calculating from the first voltage v1 value and a resistance value between the terminal 61 and the terminal 62, as will be described later on, the value of the first current i1 does not have to be obtained here.

Following this, in step S30, an output value (a detected current value) Xu and an output value (a detected current value) Xv which are output from the U-phase current detector 156 and the V-phase current detector 154, respectively, then (namely, in a state where the first current i1 flows) are stored.

Next, in step S40, a second voltage v2 is applied between the terminal 61 and the terminal 62, whereby second current is allowed to flow to the U-phase and V-phase, respectively. Note that as with the first current i1, this second voltage i2 does not have to be obtained.

Following this, in step S50, an output value (a detected current value) Yu and an output value (a detected current value) Yv which are output from the U-phase current detector 156 and the V-phase current detector 154, respectively, then (namely, in a state where the second current i2 flows) are stored.

Next, in step S60, a V-phase gain correcting coefficient is calculated based on the detected current value so stored. As has been described before, the V-phase gain correcting coefficient is a coefficient by which the detected current value which has been offset corrected is multiplied in such a manner that the gain difference of the V-phase current detector 154 relative to the U-phase current detector 156 is eliminated as a result, and to be specific, the coefficient is a reciprocal number of a ratio of the gain value of the V-phase current detector 154 relative to the U-phase current detector 156. Here, a gain value Au of the U-phase current detecting unit 156 is expressed by the following equation (1) as below.

$$Au=|Xu-Yu|/|i1-i2| \quad (1)$$

Similarly, a gain value Av of the V-phase current detector 154 is expressed by the following equation (2) as below.

$$Av=|Xv-Yv|/|i1-i2| \quad (2)$$

Consequently, the V-phase gain correcting coefficient is expressed by the following equation (3) as below.

$$gv=Au/Av=|Xu-Yu|/|Xv-Yv| \quad (3)$$

The V-phase gain correcting coefficient gv that has been calculated as has been described above is stored in a storage unit (for example, EEPROM), not shown, of the microcomputer 10 for reference when the system is activated.

Thus, since the V-phase gain correcting coefficient gv can be calculated irrespective of the values of the first and second currents i1, i2, the first and second voltages v1, v2 do not have to be applied accurately. Due to this, the V-phase gain correcting coefficient can be calculated by the simple method without using a current detector which is accurately regulated so as to constitute a reference or various types of devices for applying accurate voltages, thereby making it possible to suppress the generation of a torque ripple due to the gain difference between the respective current detectors.

In addition, since the V-phase gain correcting coefficient gv can be calculated irrespective of the values of the first and second currents i1, i2, the offset correction values do not have to be calculated in advance at the time of production. Thus, since the calculation of the V-phase gain correcting coefficient in order to eliminate the effect of the gain difference and the offset correction are made to have no relation therebetween, various types of known offset correcting methods can be applied.

Here, while the first and second voltages v1, v2 may take any voltage, provided that the voltage so taken can be applied to the motor 6, it is preferred that typically, the first voltage v1 takes a maximum voltage value that is to be applied to at the time of activation, whereas the second voltage v2 takes a minimum voltage value that is to be so applied. Then, since the values of |Xu−Yu| and |Xv−Yv| becomes maximum, the V-phase gain correcting coefficient can be calculated more accurately even when there exists a measuring tolerance between the respective current detectors. In addition, it is preferred that the first voltage v1 is a maximum voltage value within a range where the gain values of the U-phase current detector 156 and the V-phase current detector 154 do not vary (or vary little), whereas the second voltage v2 is a minimum voltage value within the same range. If this becomes true, since the values of |Xu−Yu| and |Xv−Yv| can be made to be maximum within a range where the variation in gain value becomes (substantially) linear, the V-phase gain correcting coefficient gv can be calculated more accurately.

<5. Advantage of the Invention>

As has been described heretofore, with the electric power-assisted steering system according to the embodiment of the invention, the detected current value of the V-phase current detector 154 is corrected based on the V-phase gain correcting coefficient calculated using the U-phase current detector 156 as the reference by releasing the one end (the terminal 63) of the W-phase of the motor 6 so as to allow the passage of the first and second currents i1, i2, whereby the gain difference can compensated for and the generation of torque ripple due to the gain difference between the respective current detectors can be suppressed, thereby making it possible to provide the driver with a steering feel which is free from a feeling of physical disorder.

<6. Modified Examples>

While in the embodiment, the V-phase gain correcting coefficient is described as being calculated at the time of producing (regulating) the electric power-assisted steering system of the invention, the coefficient may be calculated at an initial activation of the system or every time the system is activated. In this case, it is preferred to provide, for example, a known mechanism for mechanically separating the driving shaft of the motor 6 and the ball screw driving portion 11 as a device for suppressing the generation of an auxiliary steering force which is generated when the first and second currents i1, i2 are made to flow to the motor 6, which actually occurs in the system. In addition, while it is the microcomputer 10 activated based on the predetermined software which is stored in advance that executes the calculating procedure (refer to FIG. 4) of the V-phase gain correcting coefficient at the time of production, the execution of part or whole of the procedure may be implemented by a predetermined regulating device (or inspecting device) for calculating the V-phase correcting coefficient which is such as other than the electric power-assisted steering system according to the invention or the procedure may be executed by a combination of these devices. Furthermore, the part or whole of the procedure may be executed by a person who assembles or regulates the electric power-assisted steering system of the invention.

While in the embodiment, the V-phase gain correcting coefficient for correcting the V-phase detected current value iv is calculated, a U-phase gain correcting coefficient for correcting the U-phase detected current value iu may be calculated using the V-phase current detector 154 as the reference. In addition, the detected current value of the V-phase current detector 154 does not always have to be multiplied by the V-phase gain correcting coefficient provided that the gain difference of the V-phase current detector 154 relative to the U-phase current detector 156 can be compensated for, and the gain difference may be compensated for, for example, a predetermined hardware including an amplifier (or an attenuator), or the gain difference may be compensated for by changing a reference gain (or a table for transformation) that is used when transforming the current detected vale (output value) obtained as a voltage signal into a current vale (measured value). In this case, the reference gain that is so changed is understood to function as the gain correcting coefficient.

While in the embodiment, the corresponding offset correction values are set based on the U-phase detected current value iu and the V-phase detected current value iv which result when the ignition switch is switched on, as has been described before, since the calculation of the V-phase gain correcting coefficient for compensating for the gain difference and the offset correction have no relation at all therebetween, various known methods can be used for the offset correction. For example, the offset correction values may be set at the time of production, and furthermore, the corresponding offset correction values may be updated based on the U-phase detected current value iu and the V-phase detected current value iv which result when the ignition switch is switched on. Note that setting the offset correction values at the time of production is preferable in that a torque ripple component of the motor 6 can be inspected at the time of production. In addition, in case the offset correction values are relatively small, the offset correction may be omitted.

As has been described above, while in the embodiment, there is caused almost no problem even in the event that the U-phase detected current value iu from the U-phase current detector 156 is not accurately regulated, since the production tolerance of the current detectors is relatively large, in case the effect of the deviation between the detected current value of the U-phase current detector 156 and the true current value is not eliminated by the feedback control, it is preferable to accurately regulate the U-phase current detector 156 with the predetermined reference current detector. In this case, too, since the V-phase current detector 154 does not have to be regulated accurately by the predetermined reference current detector, man-hours can be reduced.

While in the embodiment, the motor 6 is connected in the Y connection, and the same current is made to flow to the U-phase and the V-phase by switching off the switch 65 so as to electrically separate the W-phase from the other phases, a predetermined voltage may be applied to the respective terminals 61 to 63 in FIG. 5 in such a manner that the same current is allowed to flow to the U-phase and the V-phase.

While in the embodiment, the current flowing to the U-phase and the V-phase is described as being detected by the u-phase current detector 156 and the V-phase current detector 154, current flowing to the W-phase may be detected by providing further a W-phase current detector. Note that in this configuration, a W-phase gain correcting coefficient for correcting the W-phase detected current value using the U-phase current detector 156 as the reference needs to be calculated. Furthermore, while in the embodiment, the motor 6 is the 3-phase brushless motor, the motor may be an n-phase (n is an integer equal to or larger than 4) brushless motor. In this case, in a hydraulic power-assisted steering system in which steering assistance is provided by a hydraulic pressure exerted from a pump driven by the electric motor, the invention may be applied for detection of a current flowing to the electric motor.

What is claimed is:

1. A power-assisted steering system for providing an auxiliary steering force to a steering mechanism of a vehicle by driving a brushless motor having first, second, and third phases and terminals based on a target current value determined in accordance with an operation for steering the vehicle, the power-assisted steering system comprising:
    first and second current detectors that detect current flowing to the first and second phases, respectively, of the brushless motor and output detected current values, the current detectors respectively including inherent gain values, one of the current detectors constituting a reference;
    a correcting unit that corrects the detected current values output from the first and second current detectors so as to compensate a difference in gain between the current detectors; and
    a motor driving driver that drives the brushless motor based on a deviation between the target current value and the detected current values which are corrected by the correcting unit,
    wherein when the same current flows to the phase in which the current flowing thereto is detected by the reference current detector and the phase in which the current flowing thereto is detected by the other current detector, the correcting unit calculates a gain correcting coefficient for compensating for a gain difference of the other current detector relative to the reference current detector based on a detected current value of the reference current detector and a detected current value of the other current detector, and corrects the detected current value of the other current detector based on the calculated gain correcting coefficient.

2. The power-assisted steering system according to claim 1, wherein the correcting unit makes the same current flow to the respective phases in which the current flowing thereto is detected by the reference current detector and the other current detector, by opening one or more of the terminals, and calculates the gain correcting coefficient based on detected current values of the flowing current.

3. A method for compensating for a gain difference between first and second current detectors which are provided on a power-assisted steering system in which a steering mechanism of a vehicle is provided with an auxiliary steering force by driving a brushless motor having first, second, and third phases and terminals based on a target current value determined in accordance with an operation for steering the vehicle and which is adapted to detect current flowing to predetermined phases of the brushless motor and to output the detected current values, the compensating method comprising:
    opening one or more of the terminals so that the same current is made to flow to phases of the motor in which current flowing thereto is detected by the current detectors, a first one of the current detectors constituting a reference;
    making the same current flow to the two current detectors by applying a predetermined voltage between the terminals which are not opened; and
    compensating for a gain difference of the other current detector, relative to the reference current detector, based on detected current values which are obtained by detecting the flowing current by the first and second current detectors.

4. A power-assisted steering system for providing an auxiliary steering force to a steering mechanism of a vehicle, said steering system comprising:
    a motor having a first phase, a second phase, and a third phase;
    first and second current detectors that detect current flowing to the first end second phases of the motor, respectively, and output detected current values, the current detectors respectively including inherent gain values;
a correcting unit that corrects the detected current values output from the first and second current detectors so as to compensate for a difference in gain between the current detectors; and
a motor driving driver that drives the motor based on a deviation between the target current value and the detected current values which are corrected by the correcting unit;
wherein the correcting unit corrects the detected current values by:
  applying a first voltage between the first and second phases of the motor, while maintaining the third phase open;
  detecting the amount Xu of current flowing in the first phase and the amount Yu of current flowing in the second phase;
  applying a second voltage between the first and second phases of the motor, while maintaining the third phase open;
  detecting the amount Xv of current flowing in the first phase and the amount Yv of current flowing in the second phase; and
  calculating a gain correcting coefficient gv for the second phase, where gv=|Xu−Yu|/|Xv−Yv|.

5. A method of calculating a gain correcting coefficient for use in correcting detected current values output from first and second current detectors that detect current flowing in first and second phases of a three-phase motor, said method comprising:
  applying a first voltage between the first and second phases of the motor, while maintaining the third phase open;
  detecting the amount Xu of current flowing in the first phase and the amount Yu of current flowing in the second phase;
  applying a second voltage between the first and second phases of the motor, while maintaining the third phase open;
  detecting the amount Xv of current flowing in the first phase and the amount Yv of current flowing in the second phase; and
  calculating a gain correcting coefficient gv for the second phase, where gv=|Xu−Yu|/|Xv−Yv|.

6. The method according to claim 4, further comprising applying a voltage between the first phase, the second phase, and the third phase to drive the motor with the current flowing in the second phase corrected in accordance with the calculated value of gv.

* * * * *